(12) United States Patent
Hao et al.

(10) Patent No.: US 11,277,243 B2
(45) Date of Patent: Mar. 15, 2022

(54) TRANSPARENT DEMODULATION REFERENCE SIGNAL DESIGN

(71) Applicant: QUALCOMM Incorporated, San Diego, CA (US)

(72) Inventors: Chenxi Hao, Beijing (CN); Xiaohui Liu, Lund (SE); Chao Wei, Beijing (CN); Yu Zhang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 5 days.

(21) Appl. No.: 16/467,688

(22) PCT Filed: Jan. 6, 2018

(86) PCT No.: PCT/CN2018/071682
§ 371 (c)(1),
(2) Date: Jun. 7, 2019

(87) PCT Pub. No.: WO2018/127159
PCT Pub. Date: Jul. 12, 2018

(65) Prior Publication Data
US 2019/0372737 A1    Dec. 5, 2019

(30) Foreign Application Priority Data

Jan. 6, 2017 (WO) ................ PCT/CN2017/070467

(51) Int. Cl.
*H04L 5/00* (2006.01)
*H04B 7/06* (2006.01)

(52) U.S. Cl.
CPC ......... *H04L 5/0051* (2013.01); *H04B 7/0617* (2013.01); *H04B 7/0697* (2013.01); *H04L 5/0007* (2013.01)

(58) Field of Classification Search
None
See application file for complete search history.

(56) References Cited

U.S. PATENT DOCUMENTS 8,593,933 B2    11/2013  Luo et al.
2004/0146018 A1*  7/2004  Walton ................ H04B 7/0697
                                                        370/329

(Continued)

FOREIGN PATENT DOCUMENTS

CN    103988561 A    8/2014
CN    105099967 A    11/2015

(Continued)

OTHER PUBLICATIONS

International Search Report and Written Opinion—PCT/CN2018/071682—ISA/EPO—dated Mar. 30, 2018.

(Continued)

*Primary Examiner* — Noel R Beharry
*Assistant Examiner* — Richard Schnell
(74) *Attorney, Agent, or Firm* — QUALCOMM Incorporated

(57) ABSTRACT

Certain aspects of the present disclosure provide procedures for transparent demodulation reference signal (DM-RS) design. According to certain aspects, a method of wireless communication by a base station (BS) is provided. The method generally includes transmitting one or more pilots based on at least one precoder used for transmitting data. The BS transmits the data based on the at least one precoder. A method by a user equipment (UE) includes receiving one or more pilots based on at least one precoder used for transmitting data on a channel. The UE estimates interference based on the one or more pilots and the UE decodes the data transmission based on the interference estimate.

32 Claims, 18 Drawing Sheets

(56) References Cited

U.S. PATENT DOCUMENTS

| | | | |
|---|---|---|---|
| 2008/0310534 A1* | 12/2008 | Egashira | H04L 27/3863 |
| | | | 375/260 |
| 2011/0142003 A1 | 6/2011 | Kuchi et al. | |
| 2012/0189076 A1* | 7/2012 | Khan | H04L 1/04 |
| | | | 375/267 |
| 2012/0269302 A1 | 10/2012 | Ancora | |
| 2012/0320729 A1* | 12/2012 | Jung | H04J 11/0066 |
| | | | 370/201 |
| 2014/0161205 A1 | 6/2014 | Jalloul et al. | |
| 2015/0295670 A1 | 10/2015 | Seyama | |
| 2016/0337018 A1* | 11/2016 | Hwang | H04W 52/325 |
| 2018/0102819 A1* | 4/2018 | Nishimoto | H04B 7/04 |
| 2019/0090270 A1* | 3/2019 | Zhang | H04W 74/004 |

FOREIGN PATENT DOCUMENTS

| | | |
|---|---|---|
| WO | 2011083761 A1 | 7/2011 |
| WO | 2011139759 A2 | 11/2011 |

OTHER PUBLICATIONS

International Search Report and Written Opinion—PCT/CN2017/070467—ISA/EPO—dated Sep. 30, 2017.

Qualcomm Incorporated: "Transmission Modes for NCT", 3GPP TSG-RAN WG1#69, R1-122770, May 25, 2012, 15 pages.

Qualcomm Incorporated: "DL MIMO Transmission Schemes", 3GPP TSG-RAN WG1 #86, 3GPP Draft; R1-166379, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 22, 2016-Aug. 26, 2016, Aug. 13, 2016, 4 Pages, XP051142362, Retrieved from the Internet: URL: http://www.3gpp.org/ftp/tsg_ran/WG1_RL1/TSGR1_86/Docs/ [retrieved on Aug. 13. 2016] Section 2.3.

Supplementary Partial European Search Report—EP18736306—Search Authority—Munich—dated Jul. 16, 2020.

\* cited by examiner

1000

$$\begin{bmatrix} \tilde{y}(k) \\ \tilde{y}^*(k+1) \end{bmatrix} = \begin{bmatrix} H_z(k) & 0 \\ 0 & H_z^*(k+1) \end{bmatrix} \underbrace{\begin{bmatrix} z_0(k) \\ z_1(k) \\ z_0^*(k+1) \\ z_1^*(k+1) \end{bmatrix}}_{interference} + \begin{bmatrix} n(k) \\ n^*(k+1) \end{bmatrix}$$

| | |
|---|---|
| k | Tone index |
| $H_z(k)$ | Channel of two DMRS ports on tone k $H_z(k) = [H_{z,0}(k), H_{z,1}(k)]$ |
| $z_j(k)$ | Interfering Pilot/data transmitted on DMRS port j of tone k |
| n(k) | Noise on tone k |
| s(k) | The kth data symbol |
| a(k), b(k) | The kth pilot symbol |

FIG. 10

| | $z_0(k)$ | $z_1(k)$ | $z_0(k+1)$ | $z_1(k+1)$ | $R_{zz} = z(k)z^H(k)$ | Average $R_{zz}$ per two pairs |
|---|---|---|---|---|---|---|
| Data tones | $s(k)$ | $-s^*(k+1)$ | $s(k+1)$ | $s^*(k)$ | $\begin{bmatrix} 1 & 0 & 0 & 1 \\ 0 & 1 & -1 & 0 \\ 0 & -1 & 1 & 0 \\ 1 & 0 & 0 & 1 \end{bmatrix}$ | $\begin{bmatrix} 1 & 0 & 0 & 1 \\ 0 & 1 & -1 & 0 \\ 0 & -1 & 1 & 0 \\ 1 & 0 & 0 & 1 \end{bmatrix}$ |
| DMRS tone pair 1 (OCC-2) | $a(k)$ | $a(k)$ | $a(k+1)$ | $-a(k+1)$ | $\begin{bmatrix} 1 & 1 & \phi_a & -\phi_a \\ 1 & 1 & \phi_a & -\phi_a \\ \phi_a^* & \phi_a^* & 1 & -1 \\ -\phi_a^* & -\phi_a^* & -1 & 1 \end{bmatrix}$ | $\begin{bmatrix} 1 & 0 & \phi_+ & -\phi_- \\ 0 & 1 & \phi_- & -\phi_+ \\ \phi_+^* & \phi_-^* & 1 & 0 \\ -\phi_-^* & -\phi_+^* & 0 & 1 \end{bmatrix}$, $\phi_+ = \phi_a + \phi_b$, $\phi_- = \phi_a - \phi_b$, $\phi_a = a(k)a(k+1)$, $\phi_b = b(k)b(k+1)$ |
| DMRS tone pair 2 (OCC-2) | $b(k)$ | $-b(k)$ | $b(k+1)$ | $b(k+1)$ | $\begin{bmatrix} 1 & -1 & \phi_b & \phi_b \\ -1 & 1 & -\phi_b & -\phi_b \\ \phi_b^* & -\phi_b^* & 1 & 1 \\ \phi_b^* & -\phi_b^* & 1 & 1 \end{bmatrix}$ | |

FIG. 11

| | Transmitted pilots [tone-pair 1] [tone-pair 2] | $R_{zz}$ [tone-pair 1] [tone-pair 2] |
|---|---|---|
| Opt 1: Alamouti encoding | $\begin{bmatrix} a(k) \\ -a^*(k+1) \\ a(k+1) \\ a^*(k) \end{bmatrix}, \begin{bmatrix} a(k) \\ a^*(k+1) \\ -a(k+1) \\ a^*(k) \end{bmatrix}$ | $\begin{bmatrix} 1 & -\phi^* & \phi^* & 1 \\ -\phi & 1 & -1 & \phi \\ \phi & -1 & 1 & -\phi \\ 1 & \phi^* & -\phi^* & 1 \end{bmatrix}, \begin{bmatrix} 1 & \phi & -\phi & 1 \\ \phi^* & 1 & -1 & -\phi^* \\ -\phi^* & -1 & 1 & \phi^* \\ 1 & \phi & -\phi & 1 \end{bmatrix}, \phi = a(k)a(k+1)$ |
| Opt 2: modified OCC-2 | $\begin{bmatrix} a(k) \\ a(k) \\ -a^*(k) \\ a^*(k) \end{bmatrix}, \begin{bmatrix} b(k) \\ -b(k) \\ b^*(k) \\ b^*(k) \end{bmatrix}$ | $\begin{bmatrix} 1 & 1 & -1 & 1 \\ 1 & 1 & -1 & 1 \\ -1 & -1 & 1 & -1 \\ 1 & 1 & -1 & 1 \end{bmatrix}, \begin{bmatrix} 1 & -1 & 1 & 1 \\ -1 & 1 & -1 & -1 \\ 1 & -1 & 1 & 1 \\ 1 & -1 & 1 & 1 \end{bmatrix}$ |

| | $z_0(k)$ | $z_1(k)$ | $z_0(k+1)$ | $z_1(k+1)$ | $R_{zz}$ | Average $R_{zz}$ per two pair |
|---|---|---|---|---|---|---|
| Data tones | $s(k)$ | $s(k+1)$ | $s(k+2)$ | $s(k+3)$ | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |
| DMRS tone pair 1 (OCC-2) | $a(k)$ | $a(k)$ | $a(k+1)$ | $-a(k+1)$ | $\begin{bmatrix} 1 & 1 & \phi_a & -\phi_a \\ 1 & 1 & \phi_a & -\phi_a \\ \phi_a^* & \phi_a^* & 1 & -1 \\ -\phi_a^* & -\phi_a^* & -1 & 1 \end{bmatrix}$ | $\begin{bmatrix} 1 & 0 & \phi_+ & -\phi_- \\ 0 & 1 & \phi_- & -\phi_+ \\ \phi_+^* & \phi_-^* & 1 & 0 \\ -\phi_-^* & -\phi_+^* & 0 & 1 \end{bmatrix}$, $\phi_+ = \phi_a + \phi_b$, $\phi_- = \phi_a - \phi_b$, $\phi_a = a(k)a(k+1)$, $\phi_b = b(k)b(k+1)$ |
| DMRS tone pair 2 (OCC-2) | $b(k)$ | $-b(k)$ | $b(k+1)$ | $b(k+1)$ | $\begin{bmatrix} 1 & -1 & \phi_b & \phi_b \\ -1 & 1 & -\phi_b & -\phi_b \\ \phi_b^* & -\phi_b^* & 1 & 1 \\ \phi_b^* & -\phi_b^* & 1 & 1 \end{bmatrix}$ | |

FIG. 17

| Transmitted pilots | |
|---|---|
| [tone-pair 1] | $\begin{bmatrix} a(k) \\ a(k) \end{bmatrix}, \begin{bmatrix} b(k) \\ -b(k) \end{bmatrix},$ |
| [tone-pair 2] | $\begin{bmatrix} a(k) \\ a(k) \end{bmatrix}, \begin{bmatrix} -b(k) \\ b(k) \end{bmatrix},$ |
| [tone-pair 3] | $\begin{bmatrix} a(k+1) \\ -a(k+1) \end{bmatrix}, \begin{bmatrix} b(k+1) \\ b(k+1) \end{bmatrix},$ |
| [tone-pair 4] | $\begin{bmatrix} -a(k+1) \\ a(k+1) \end{bmatrix}, \begin{bmatrix} -b(k+1) \\ -b(k+1) \end{bmatrix}$ |
| $R_{zz}$ per tone-pair | $\begin{bmatrix} 1 & 1 & \phi_a & -\phi_a \\ 1 & 1 & \phi_a & -\phi_a \\ \phi_a^* & \phi_a^* & 1 & -1 \\ -\phi_a^* & -\phi_a^* & -1 & 1 \end{bmatrix}, \begin{bmatrix} 1 & 1 & -\phi_a & \phi_a \\ 1 & 1 & -\phi_a & \phi_a \\ -\phi_a^* & -\phi_a^* & 1 & -1 \\ \phi_a^* & \phi_a^* & -1 & 1 \end{bmatrix},$ $\begin{bmatrix} 1 & -1 & \phi_b & -\phi_b \\ -1 & 1 & -\phi_b & \phi_b \\ \phi_b^* & -\phi_b^* & 1 & 1 \\ -\phi_b^* & \phi_b^* & 1 & 1 \end{bmatrix}, \begin{bmatrix} 1 & -1 & -\phi_b & \phi_b \\ -1 & 1 & \phi_b & -\phi_b \\ -\phi_b^* & \phi_b^* & 1 & 1 \\ \phi_b^* & -\phi_b^* & 1 & 1 \end{bmatrix},$ |

FIG. 18

TRANSPARENT DEMODULATION REFERENCE SIGNAL DESIGN

This application is a national stage application under 35 U.S.C. 371 of PCT/CN2018/071682, filed Jan. 6, 2018, which claims priority to International Application No. PCT/CN2017/070467, filed Jan. 6, 2017, which are incorporated herein by reference in their entirety for all applicable purposes.

BACKGROUND

Field of the Disclosure

Aspects of the present disclosure related generally to wireless communications systems, and more particularly, to transparent demodulation reference signal (DM-RS) design for certain such systems, such as new radio (NR) systems.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more BSs may define an eNodeB (eNB). In other examples (e.g., in a new radio (NR), next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, a next generation NM (gNB), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for transparent demodulation reference signal (DM-RS) design are described herein.

In an aspect, a method for wireless communications is provided. The method may be performed, for example, by a user equipment (UE) or a base station (BS). The method generally includes receiving one or more pilots based on at least one precoder used for transmitting data on a channel. The method includes estimating interference based on the one or more pilots and decoding the data transmission based on the interference estimate.

In an aspect, an apparatus for wireless communications is provided. The apparatus may be, for example, a UE or a BS. The apparatus generally includes means for receiving one or more pilots based on at least one precoder used for transmitting data on a channel. The apparatus includes means for estimating interference based on the one or more pilots and means for decoding the data transmission based on the interference estimate.

In an aspect, an apparatus for wireless communications is provided. The apparatus may be, for example, a UE or a BS. The apparatus generally includes a receiver configured to receive one or more pilots based on at least one precoder used for transmitting data on a channel. The apparatus includes at least one processor coupled with a memory and configured to estimate interference based on the one or more pilots and decode the data transmission based on the interference estimate.

In an aspect, a computer readable medium is provided having computer executable code stored thereon for wireless communications by a UE or BS. The computer readable medium generally includes code for receiving one or more pilots based on at least one precoder used for transmitting data on a channel. The computer readable medium includes code for estimating interference based on the one or more pilots and code for decoding the data transmission based on the interference estimate.

In an aspect, a method for wireless communications is provided. The method may be performed, for example, by a UE or a BS. The method generally includes transmitting one or more pilots based on at least one precoder used for transmitting data. The method includes transmitting the data based on the at least one precoder In an aspect, an apparatus for wireless communications is provided. The apparatus may be, for example, a UE or a BS. The apparatus generally includes means for transmitting one or more pilots based on at least one precoder used for transmitting data. The apparatus includes means for transmitting the data based on the at least one precoder.

In an aspect, an apparatus for wireless communications is provided. The apparatus may be, for example, a UE or a BS. The apparatus generally includes a memory coupled with at least one processor, the memory and at least one processor configured to transmit one or more pilots based on at least one precoder used for transmitting data. The apparatus includes a transmitter configured to transmit the data based on the at least one precoder.

In an aspect, a computer readable medium is provided having computer executable code stored thereon for wireless communications by a UE or BS. The computer readable medium generally includes code for transmitting one or more pilots based on at least one precoder used for transmitting data and code for transmitting the data based on the at least one precoder.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 10 is an example general equation for interference plus noise (Rnn) observed by a UE, in accordance with certain aspects of the present disclosure.

FIG. 11 illustrates example Rnn mismatch on data tones and demodulation reference signal (DM-RS) tones for SFBC.

FIG. 14 illustrates example matrices representing DM-RS designs for SFBC and the corresponding average Rnn (Rzz) per resource block, in accordance with certain aspects of the present disclosure.

FIG. 17 illustrates example Rnn mismatch on data and DM-RS tones for rank-2 spatial multiplexing.

FIG. 18 illustrates example matrices representing DM-RS designs for rank-2 spatial multiplexing and corresponding Rzz, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
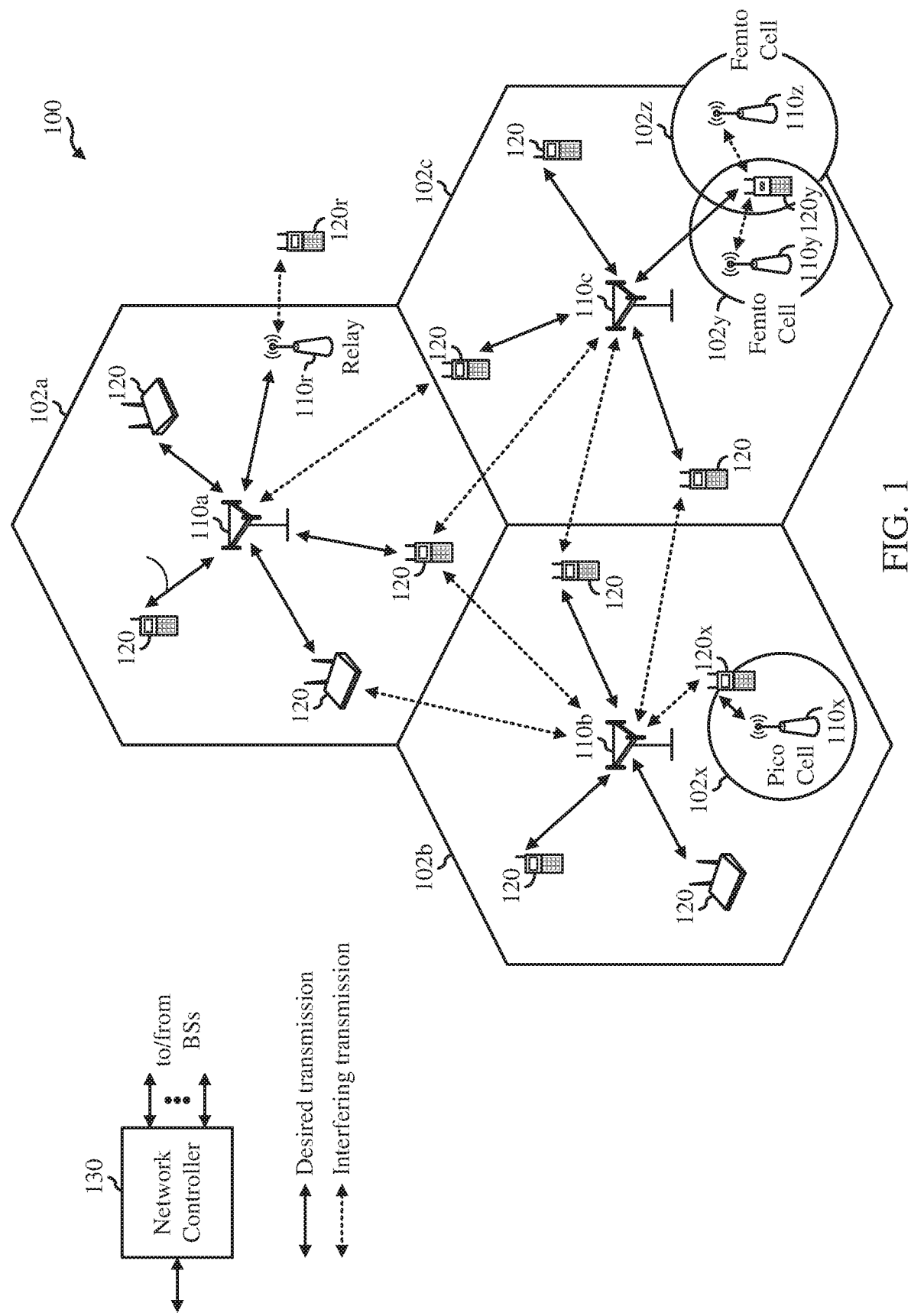
FIG. 1 is a block diagram conceptually illustrating an example wireless communications system, in accordance with certain aspects of the present disclosure.

Aspects of the present disclosure may be used in NR (new radio access technology) systems. NR may refer to radios configured to operate according to a new air interface (e.g., other than orthogonal frequency divisional multiple access (OFDMA)-based air interfaces) or fixed transport layer (e.g., other than Internet Protocol (IP)). NR may support services including enhanced mobile broadband (eMBB) targeting wide bandwidth (e.g. 80 MHz or beyond), millimeter wave (mmW) targeting high carrier frequency (e.g. 27 GHz or beyond), massive machine type communications (mMTC) targeting non-backward compatible MTC techniques, and/or mission critical communication targeting ultra reliable low latency communications (URLLC). For these general topics, different techniques are considered, such as coding, low-density parity check (LDPC) and polar. NR cell may refer to a cell operating according to the new air interface or fixed transport layer.

Certain systems, such as NR systems, may use space frequency block coding (SFBC) for downlink and/or uplink data transmission. As will be described in further detail herein, if conventional demodulation reference signal (DM-RS) design is used, this may lead to mismatch between interference estimated from the DM-RS and the actual interference observed at the receiver.

Accordingly, aspects of the present disclosure provide apparatus, methods, processing systems, and computer program products for transparent DM-RS design.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE. CDMA. TDMA, FDMA. OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000. IS-95 and IS-856 standards. A TDMA network may implement a radio technology such as Global System for Mobile Communications (GSM). An OFDMA network may implement a radio technology such as NR (e.g. 5G RA). Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communications network 100 in which aspects of the present disclosure may be performed. For example, wireless communications network 100 may be a new radio (NR) or 5G network. UEs 120 and/or BSs 110 may be configured to perform the operations 1200 and/or 1300 discussed in more detail below for a transparent demodulation reference signal (DM-RS) design for data transmitted using space frequency block coding (SFBC). For example, UE 120 or BS 110 may transmit one or more pilots based on a precoder used for data transmission (e.g., SFBC). The receiving device, a BS 110 or UE 120, may perform a channel estimate using the pilots and decode the data based on the channel estimate.

As illustrated in FIG. 1, wireless communications network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and next generation node B (gNB), NB, 5G NB, access point (AP), NR BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in wireless communications network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a. 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

Wireless communications network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless communications network 100 may be a heterogeneous network that includes BSs of different types, e.g., macro BS, pico BS, femto BS, relays, etc. These different types of BSs may have different transmit power levels, different coverage areas, and different impact on interference in wireless communications network 100. For example, macro BS may have a high transmit power level (e.g., 20 Watts) whereas pico BS, femto BS, and relays may have a lower transmit power level (e.g., 1 Watt).

Wireless communications network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. In on example, NR resource blocks may span 12 subcarriers with a sub-carrier bandwidth of 15 kHz over a 1 ms duration. Each radio frame may consist of 10 subframes with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16 . . . slots) depending on the tone-spacing (e.g., 15, 30, 60, 120, 240 . . . kHz).

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. For scheduled communication, subordinate entities utilize resources allocated by the scheduling entity. BSs 110 are not the only entities that may function as a scheduling entity. In some examples, UE 120 may function as a scheduling entity, scheduling resources for one or more subordinate entities (e.g., one or more other UEs 120). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
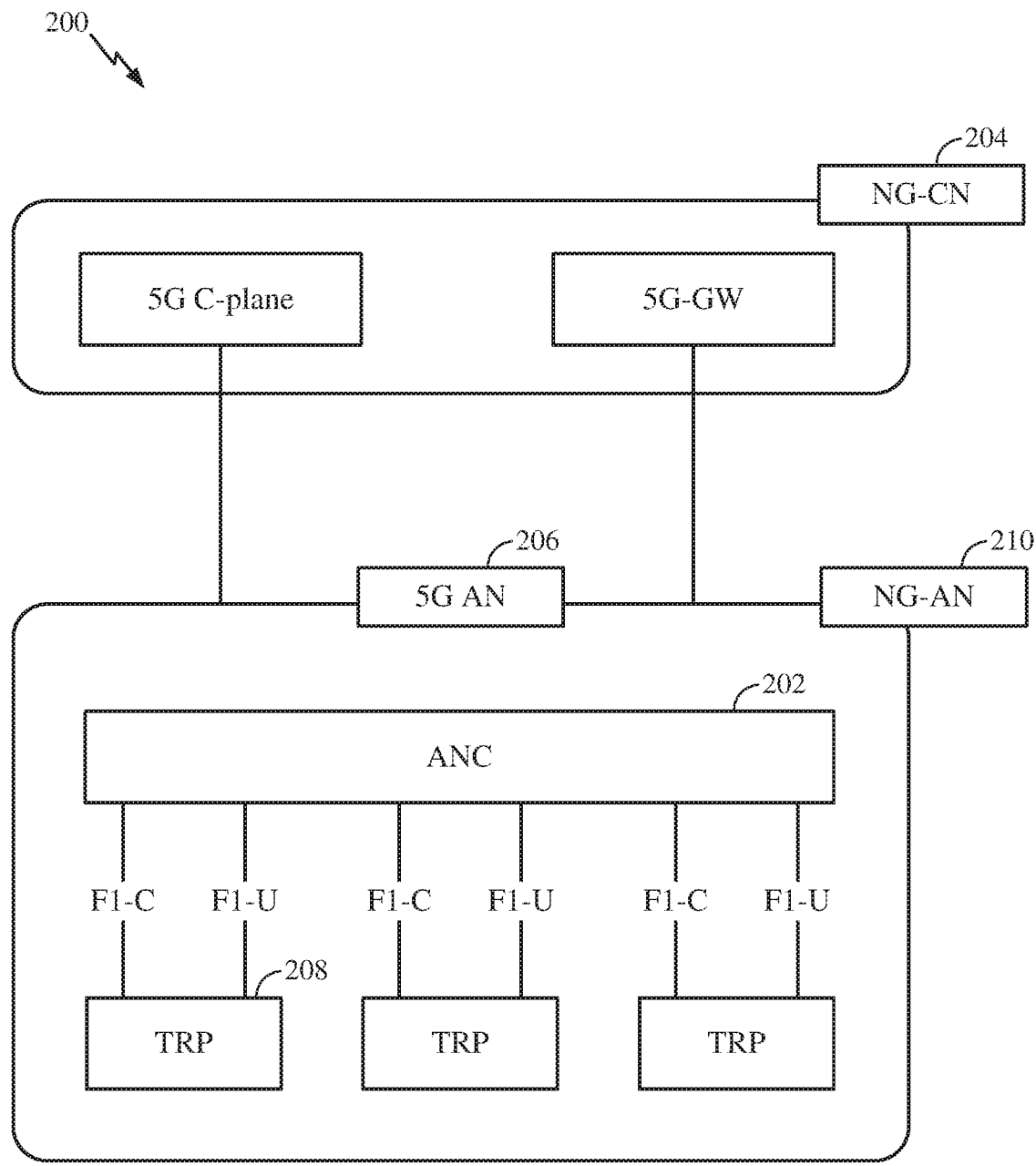
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, gNBs, or some other term). As described above, a TRP may be used interchangeably with "cell.".

A TRPs 208 may be a DU. TRPs 208 may be connected to one ANC (ANC 202) or more than one ANC (not illustrated). For example, for RAN sharing, radio as a service (RaaS), and service specific AND deployments, the TRP 208 may be connected to more than one ANC. A TRP 208 may include one or more antenna ports. The TRPs 208 may be configured to individually (e.g., dynamic selection) or jointly (e.g., joint transmission) serve traffic to a UE.

The logical architecture may support fronthauling solutions across different deployment types. For example, the logical architecture may be based on transmit network capabilities (e.g., bandwidth, latency, and/or jitter).

The logical architecture may share features and/or components with LTE. NG-AN 210 may support dual connectivity with NR. The NG-AN 210 may share a common fronthaul for LTE and NR.

The logical architecture may enable cooperation between and among TRPs 208. For example, cooperation may be preset within a TRP 208 and/or across TRPs 208 via the ANC 202. An inter-TRP interface may not be present.

The logical architecture of the RAN 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
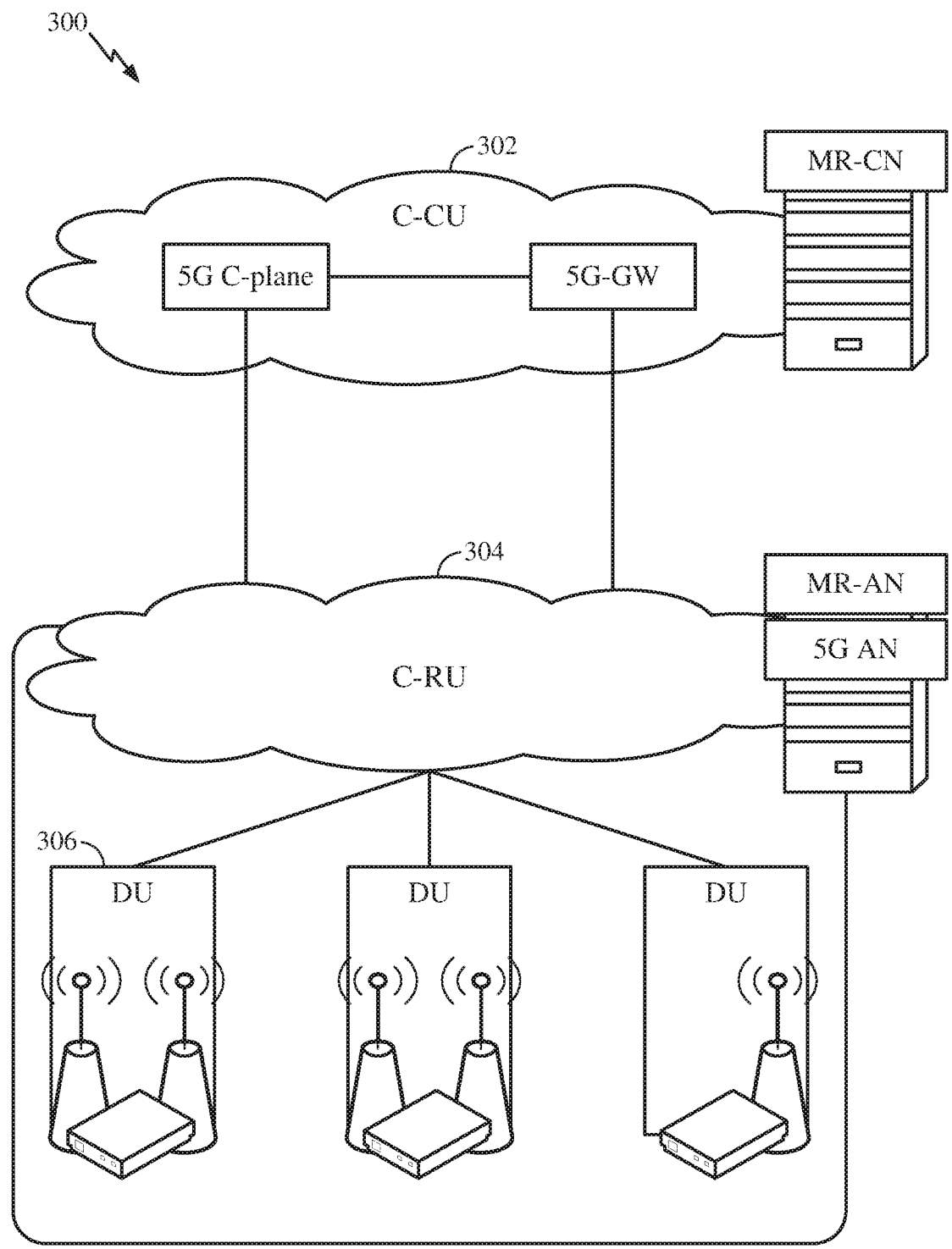
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), to handle peak capacity.

A centralized RAN unit (C-RU) 304 may host one or more ANC functions. The C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU 306 may be located at edges of the network with radio frequency (RF) functionality.

Figure 4:
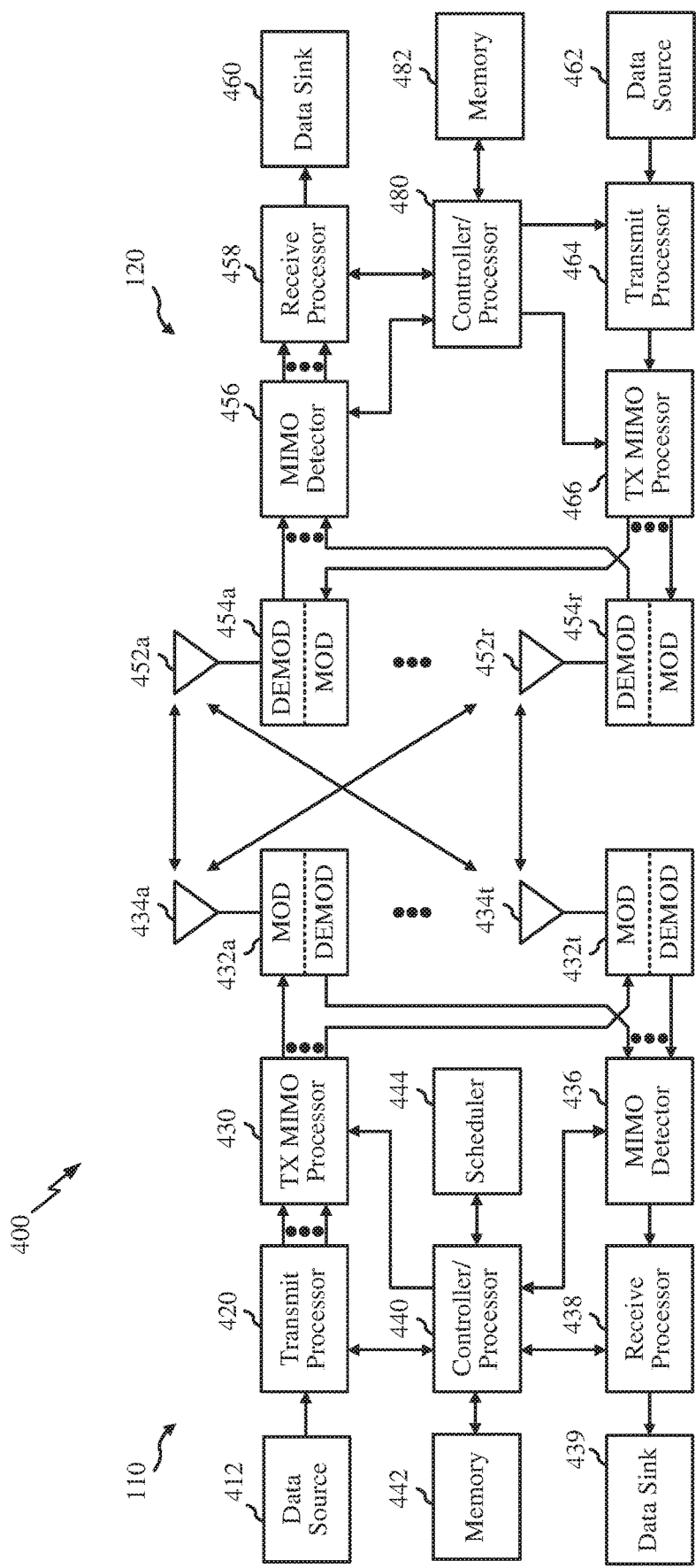
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure. The BS may be a gNB. One or more components of BS 110 and UE 120 may be used to practice aspects of the present disclosure. For example, antennas 452. Tx/Rx 454, processors 466, 458, 464, and/or controller/processor 480 of UE 120 and/or antennas 434, processors 420, 430, 438, and/or controller/processor 440 of BS 110 may be used to perform the operations described herein and illustrated with reference to FIG. 12 and/or FIG. 13.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS110 may also be a base station of some other type. The base station 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the BS 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the base station 110 may perform or direct, e.g., the execution of the functional blocks illustrated in FIG. 12 and/or FIG. 13, and/or other processes for the techniques described herein. The memories 442 and 482 may store data and program codes for the BS 110 and the UE 120, respectively. A scheduler 444 may schedule UEs for data transmission on the downlink and/or uplink.

Figure 5A:
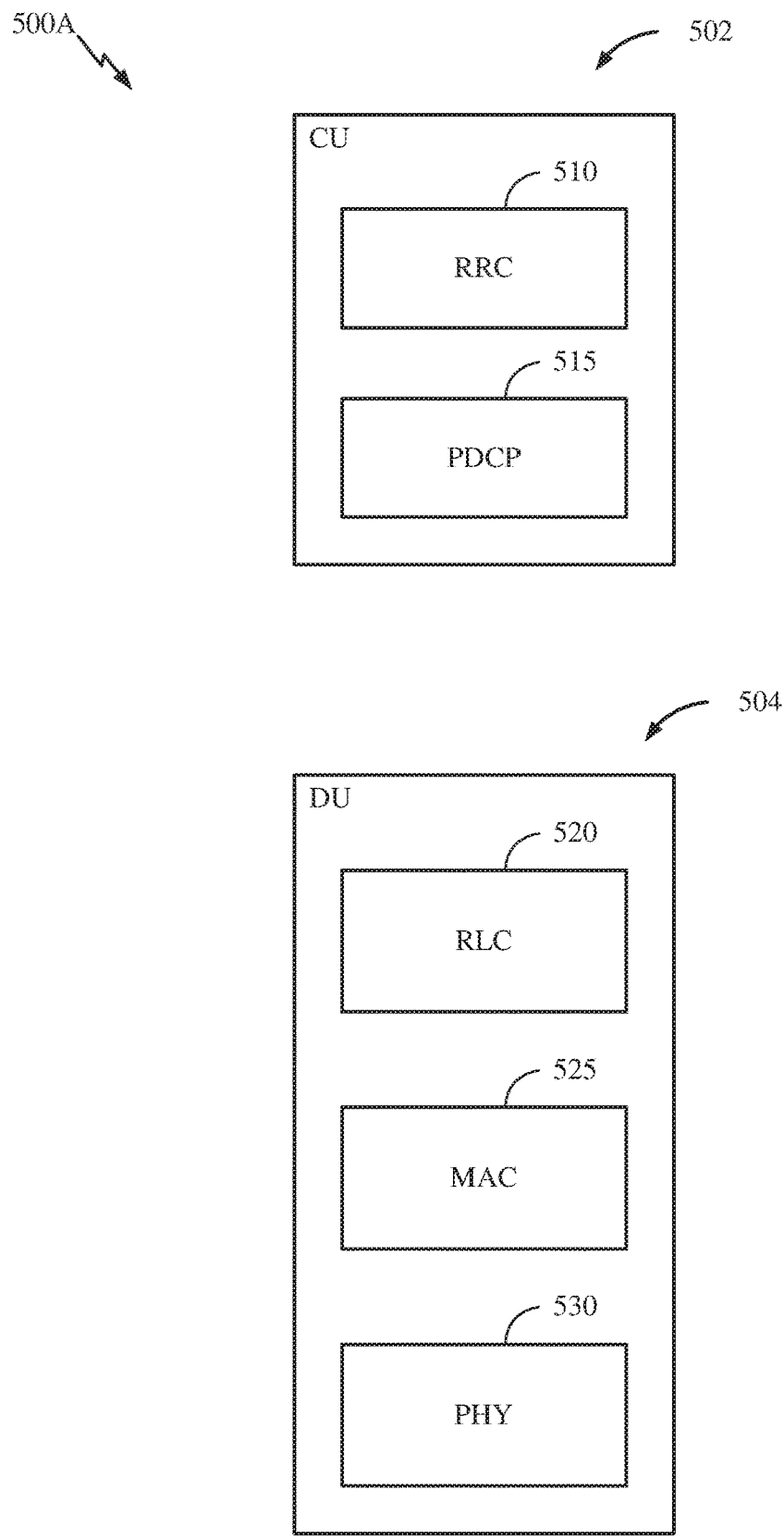
FIG. 5A is a diagram showing an example for a split implementation of a communication protocol stack between a central unit (CU) and distributed unit (DU), in accordance with certain aspects of the present disclosure.
Figures 5B, 5C:
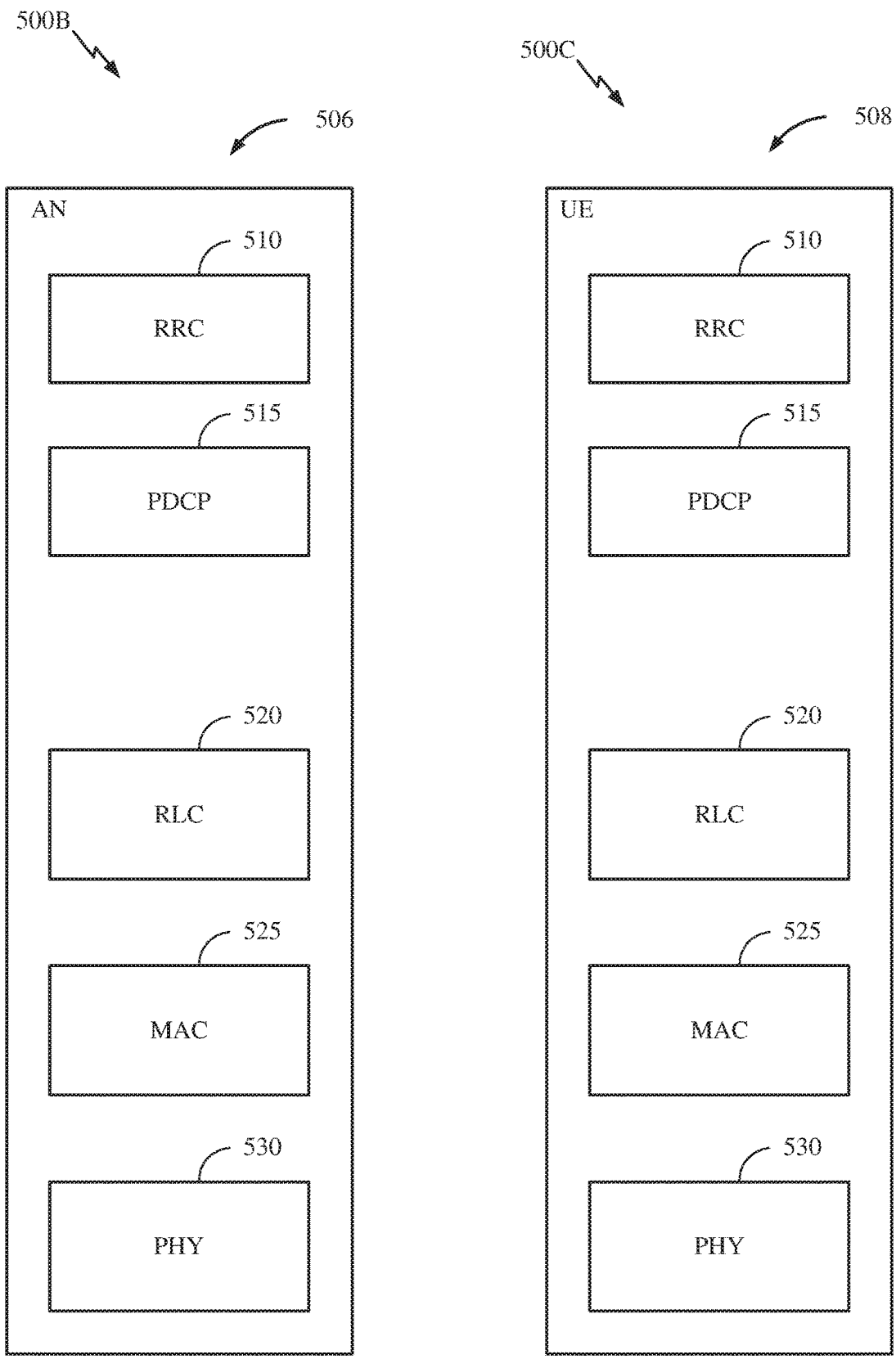
FIG. 5B is a diagram showing an example for a unified implementation of a communication protocol stack at an access node (AN), in accordance with certain aspects of the present disclosure.
FIG. 5C is a diagram showing an example for a unified implementation of a communication protocol stack at a UE, in accordance with certain aspects of the present disclosure.

FIGS. 5A-5B illustrate examples for implementing a communications protocol stack, according to aspects of the present disclosure. The illustrated communications protocol stacks may be implemented by devices operating in a 5G system. FIGS. 5A-5B illustrate a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device including, for example, AN 506. CU 502, DU 504, and/or a UE 508.

For example, FIG. 5A shows a split implementation 500A of a protocol stack, in which implementation of the protocol stack is split between CU 502, a centralized network access device (e.g., such as an ANC 202 in FIG. 2), and DU 504, a distributed network access device (e.g., such as DU 208 in FIG. 2). As shown in FIG. 5A. RRC layer 510 and PDCP layer 515 may be implemented by CU 502, and RLC layer 520, MAC layer 525, and PHY layer 530 may be implemented by DU 504. CU 502 and DU 504 may be collocated or non-collocated. The split implementation 500A illustrated in FIG. 5A may be useful in a macro cell, micro cell, or pico cell deployment.

Alternatively, FIG. 5B shows a unified implementation 500B of the protocol stack, in which the protocol stack is implemented in AN 506, a single network access device (e.g., an AN, NR BS, NR NB, network node (NN), etc.). As shown in FIG. 5B, RRC layer 510, PDCP layer 515, RLC layer 520, MAC layer 525, and PHY layer 530 may each be implemented by the AN 506. The unified implementation 500B may be useful in a femto cell deployment.

Regardless of whether a network access device implements part or all of a protocol stack, a UE may implement an entire protocol stack. For example, as shown in FIG. 5C. UE 508 implements RRC layer 510, PDCP layer 515, RLC layer 520, MAC layer 525, and PHY layer 530.

Figure 6:
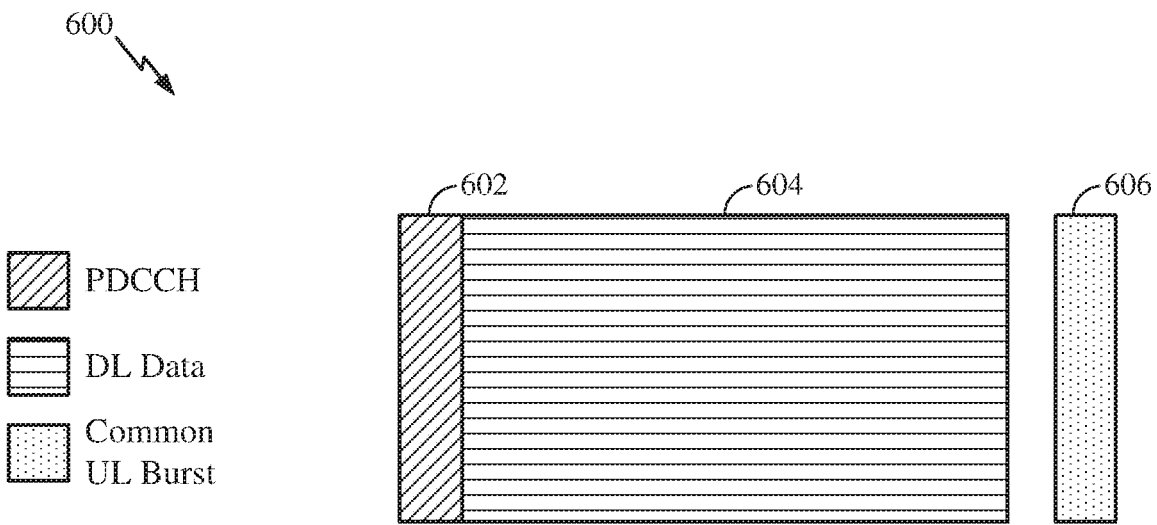
FIG. 6 illustrates an example of a downlink-centric subframe, in accordance with certain aspects of the present disclosure.

FIG. 6 is a diagram showing an example format of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the comnunon UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of format of a DL-centric subframe and alternative structures having similar features may exist without necessarily deviating from the aspects described herein.

Figure 7:
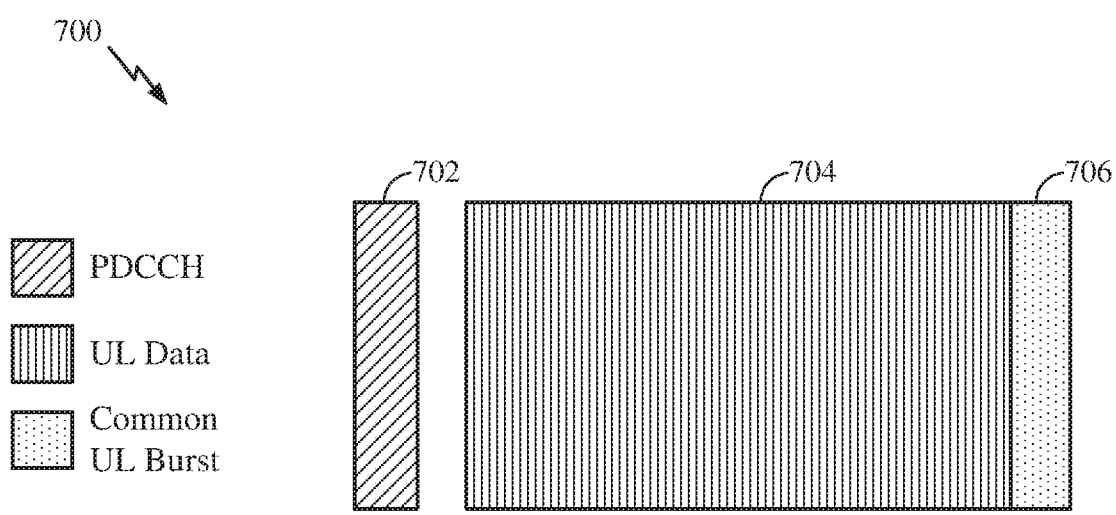
FIG. 7 illustrates an example of an uplink-centric subframe, in accordance with certain aspects of the present disclosure.

FIG. 7 is a diagram showing an example format of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Transparent DM-RS Design

Interference rejection is used in wireless systems (e.g., such as wireless communications network 100) to increase throughput. In the practical wireless communications framework, inter-cell interference is measured at the channel estimation stage via demodulation reference signal (DM-RS) and is used in the data demodulation.

Figure 8:
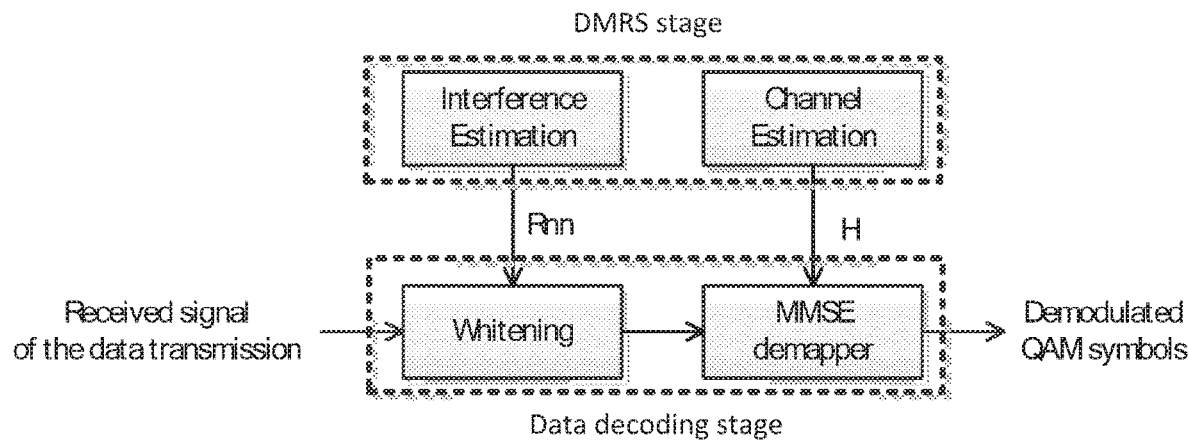
FIG. 8 illustrates an example data demodulation at a receiver, in accordance with certain aspects of the present disclosure.

FIG. 8 shows an example receiver (e.g., a minimum mean squared error (MMSE) interference rejection combining (IRC) receiver) structure. As shown in FIG. 8, DMRS can be to determine the channel estimate (H) and the estimated interference Rnn (interference plus noise covariance matrix). During the data decoding, the estimated Rnn is used to whiten the received data transmission (e.g., to perform interference rejection), and the channel estimation H is used to demodulate/decode the data. The effects of interference signals are mitigated by MMSE-IRC receivers and, as a result, increase user throughput even in areas that are recently experiencing high interference. The multiple receiver antennas are used by the MMSE-IRC receivers to create points, in the arrival direction of the interference signal, where the antenna gain drops ("nulls"), thereby suppressing the interference signal. In these procedures, for example. Rnn may be determined (e.g., calculated/measured/estimated) using the following equation:

$$R_{nn}=(y-Hx)(y-Hx)^H=\tilde{y}\tilde{y}^H,$$

where y is the received signal of the UE (at the DM-RS stage), H is the channel estimate of the UE, x is the DM-RS pilot, $\tilde{y}=y-Hx$ is the interference plus noise seen by the UE, and "$^H$" denotes conjugate transpose.

The above procedures require that the measured/estimated interference and the actual interference seen/observed at the data transmission should be consistent, in order for interference rejection to be effectively performed.

Figure 9:
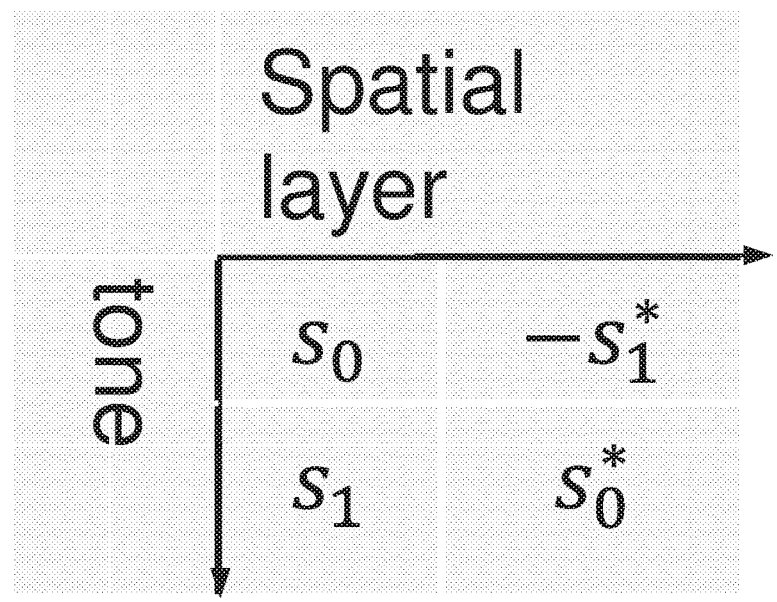
FIG. 9 illustrates an example of space frequency block code (SFBC) transmission, in accordance with certain aspects of the present disclosure.

In certain systems, such as new radio (NR) systems (e.g., 5G systems), a transmission diversity scheme such as space frequency block coding (SFBC) may be supported by DM-RS. FIG. 9 illustrates an example of SFBC transmission precoding. Space frequency coding is a general term used to indicate multi-antenna transmission schemes where modulation symbols are mapped in the frequency and spatial (transmit antenna) domain to exploit the diversity offered by multiple transmit antennas. The term space is used because each modulated symbol is transmitted from physically separated multiple antenna elements (or in some cases, different logical antenna ports). The term frequency is used because each modulated symbol is mapped onto multiple resource elements (REs) which are separated in frequency, i.e., they use different subcarriers.

As shown in FIG. 9, SFBC uses transmission diversity—two modulation symbols can be transmitted across two tones using different antenna ports and decoding can be performed per two tones. Two consecutive modulation symbols $S_0$ and Si are mapped directly to frequency-adjacent resource elements on the first antenna port. On the second antenna port the frequency-swapped and transformed symbols—$S^*_1$ and $S^*_0$ are mapped to the corresponding resource elements, where "*" denotes complex conjugate. The equation at the top of FIG. 10 shows the interference plus noise (e.g., Rnn) observed by the SFBC-UE (for two tones). Alamouti encoding encodes two input symbols a(k) and a(k+1) into four output symbols a(k), −a*(k+1), a(k+1), a*(k), where the symbols are represented as complex values and "*" denotes complex conjugation, and where rows correspond to space and columns correspond to time (space-time encoding). With an Alamouti encoding scheme, the first symbol a(k) and the negative conjugate of the second symbol −a*(k+1) are transmitted at a first time instant n over a first and a second transmit port, respectively. In the next time instant n+1, the second symbol a(k+1) and the conjugate of the first symbol a*(k) are transmitted over the first and the second transmit ports, respectively. Two pilots are transmitted over a first transmit port and the conjugates are transmitted over a second transmit port. For decoding, it is assumed that the channel conditions are the same for the times n and n+1 (in case of space-time encoding). Alamouti encoding belongs to the class of orthogonal codes since the columns of the coding matrix S are orthogonal, which allows for a simple decoding.

Since the precoder currently used in DM-RS is different from the precoder used for SFBC, there is a mismatch between the measured interference and the interference seen at data transmission, as shown in FIG. 11. The covariance matrix $R_{zz}$ for data tones is different than covariance matrix pilot or DM-RS tones. Therefore, using the conventional DM-RS design results in performance degradation. Accordingly, what is needed are techniques and apparatus for a new DM-RS design that is suitable for SFBC. When there is no interference mismatch, there will be a significant performance gain.

Aspects of the present disclosure provide apparatus, methods, processing systems, and computer program products for a transparent DM-RS that may provide estimated interference, based on the DM-RS, that is consistent with the actual interference seen at SFBC data transmission.

According to certain aspects, a pilot sequence (e.g., a DM-RS sequence) can be designed so that it has the same structure as the SFBC-precoded data. Since SFBC-precoded data is performed every two tones, the proposed pilot sequence based on the SFBC precoder may use a tone-pair structure. Tone-pairs can be grouped to enhance the interference measurement accuracy. The tone-pair based pilot sequence design and tone-pair grouping can be applied to the DM-RS design for spatial multiplexing as well. The proposed new pilot sequence design may eliminate Rnn mismatch between the interference estimate based on the pilots and the actual interference observed at data transmission and enhance the throughput. The interference structure may provide information about the transmission scheme being used by the interfering cell.

Figure 12:
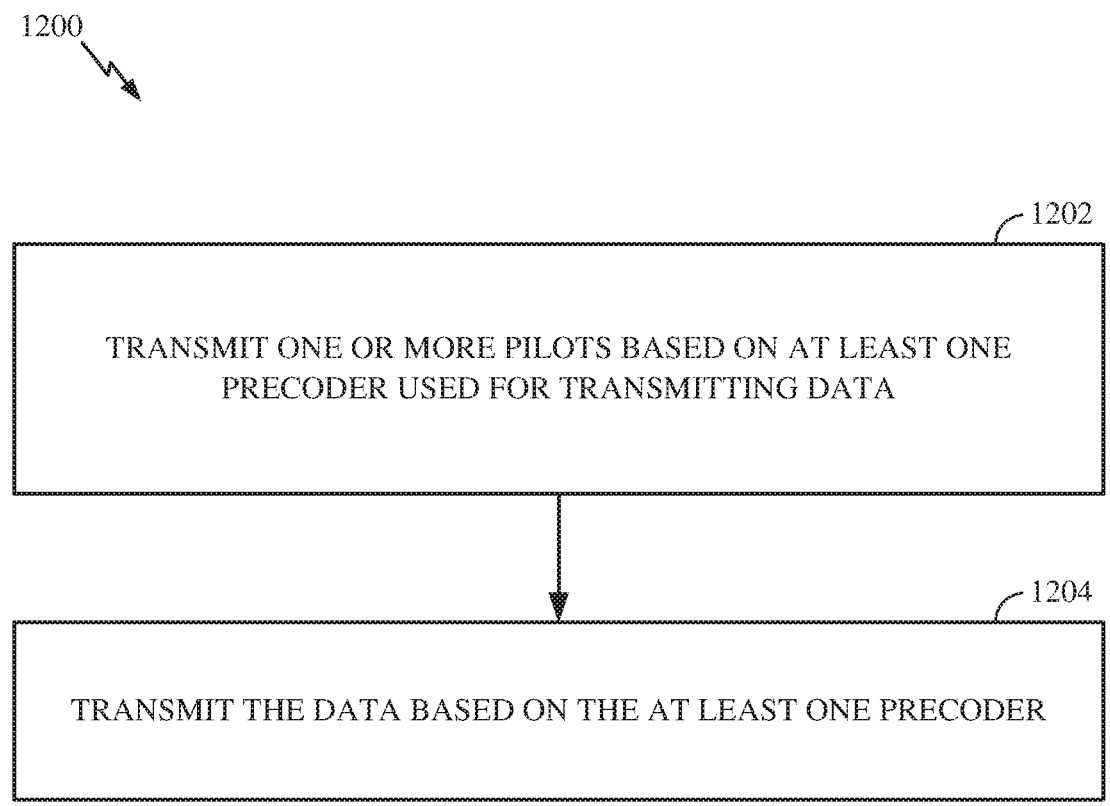
FIG. 12 is a flowchart illustrating example operations for DM-RS and data transmission, according to aspects of the present disclosure.

FIG. 12 is a flowchart illustrating example operations 1200 for DM-RS and data transmission by a transmitting device, according to aspects of the present disclosure. For example, the transmitting device may be a UE (e.g., such as a UE 120) for uplink SFBC or a BS (e.g., such as a BS 110) for downlink SFBC. Operations 1200 may begin at 1202 by transmitting one or more pilots (e.g., DM-RS) based on at least one precoder used for transmitting data (e.g., SFBC precoded data). At 1204, the transmitting device transmits the data based on the at least one precoder (e.g., using SFBC).

Figure 13:
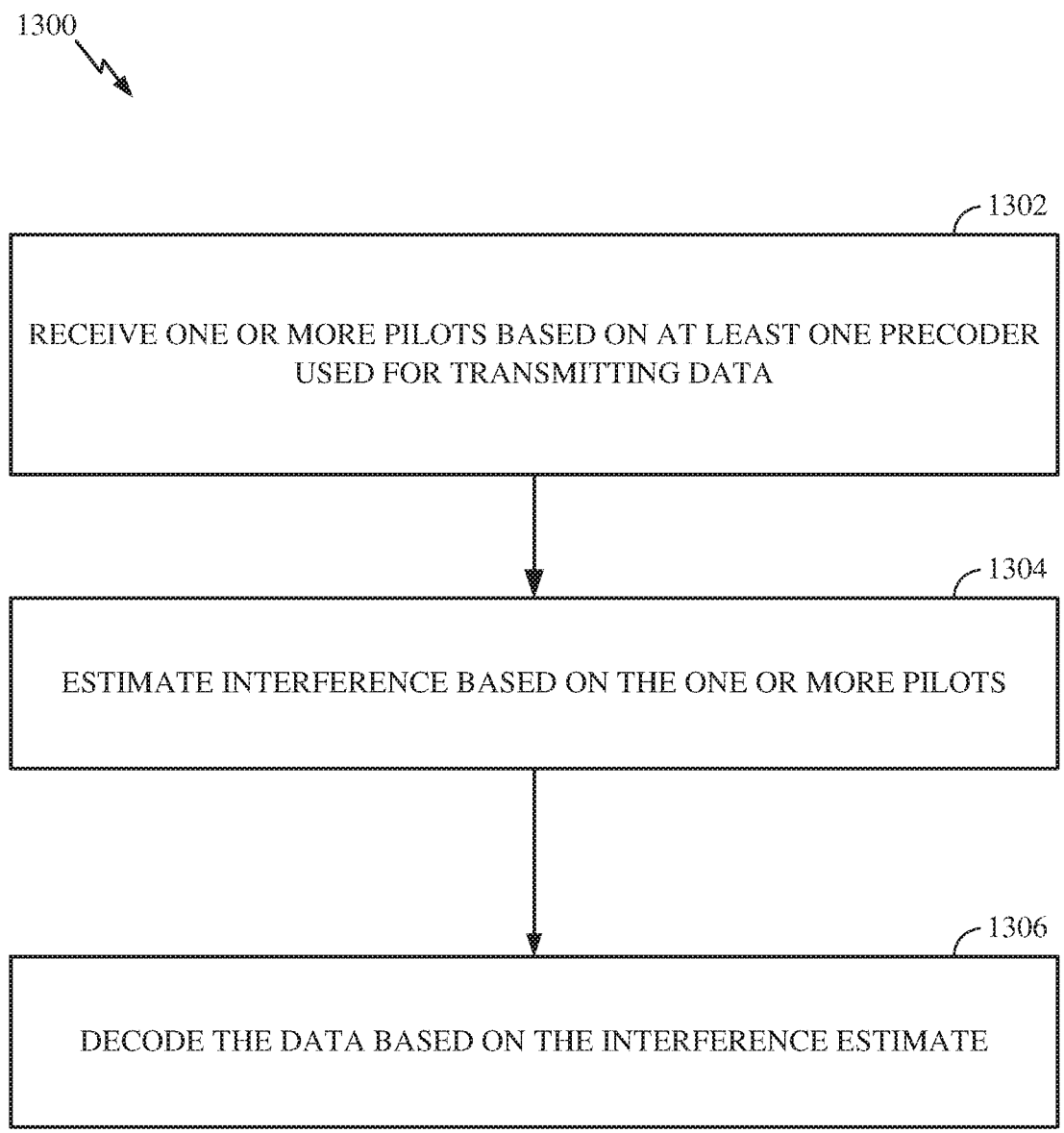
FIG. 13 is a flowchart illustrating example operations for DM-RS and data reception, according to aspects of the present disclosure.

FIG. 13 is a flowchart illustrating example operations 1300 for DM-RS and data reception by a receiving device, according to aspects of the present disclosure. For example, the receiving device may be a UE (e.g., such as a UE 120) for DL SFBC or a BS (e.g., such as a BS 110) for UL SFBC. Operations 1300 may begin at 1302 by receiving (e.g., from an interfering BS) one or more pilots (e.g., DM-RS) based on at least one precoder used for transmitting data (e.g., SFBC precoded data). At 1304, the receiving device estimates interference (e.g., inter-cell interference) based on the one or more pilots. The receiving device may also receive pilots from the serving BS and estimate the channel H based on the one or more pilots from the serving BS. At 1306, the receiving device decodes the data based on the interference estimate. The receiving device may remove interference from the data using the interference estimate and demodulate the data using the channel estimate.

Example Pilot Sequence Design for SFBC

One proposed UE-RS design for SFBC is described in the following. According to certain aspects, for data transmitted using SFBC, the UE may transmit pilots, for example DM-RS, having a design matching Rnn seen at the data transmission. For example, conjugate pilots can be transmitted on each tone-pair. For example, two pilots, $\alpha_1$ and $\alpha_2$, and their conjugates $\alpha_1^*$ and $\alpha_2^*$ may be transmitted on each tone pair. One antenna port may transmit the two pilots, and another port may transmit the conjugates of the two pilots. For example, the pilots transmitted on each tone pair may follow the structure $[\alpha_1, \alpha_2, -\alpha_2^*, \alpha_1^*]^T$, where $\alpha_1$ is the first pilot, $\alpha_2$ is the second pilot, $-\alpha_2^*$ is the negative conjugate of the second pilot, and $\alpha_1^*$ is the conjugate of the first pilot. In this example, $\alpha_1$ and $\alpha_2$ are transmitted in a tone pair on the first antenna port and $-\alpha_2^*$ and $\alpha_1^*$ are transmitted in the tone pair on another antenna port.

Two tone-pairs may form a tone-pair group. Pilots may be transmitted on the two tone-pairs. Two tone pairs totals to 4 tones. Transmission of the pilots in the tone-pair group may satisfy $\alpha_1\alpha_2^*+\beta_1\beta_2^*=0$, where $\alpha_1$ is a first pilot (transmitted on the first tone pair), $\alpha_2^*$ is the conjugate of a second pilot (transmitted on the first tone pair), $\beta_1$ is a third pilot (transmitted on the second tone pair), and $\beta_2^*$ is the conjugate of a fourth pilot (transmitted on the second tone pair).

The average covariance matrix of the pilots per tone-pair group (Rzz) may be given by:

$$R_{zz} = \begin{bmatrix} 1 & 0 & 0 & 1 \\ 0 & 1 & -1 & 0 \\ 0 & -1 & 1 & 0 \\ 1 & 0 & 0 & 1 \end{bmatrix}$$

Figure 15:
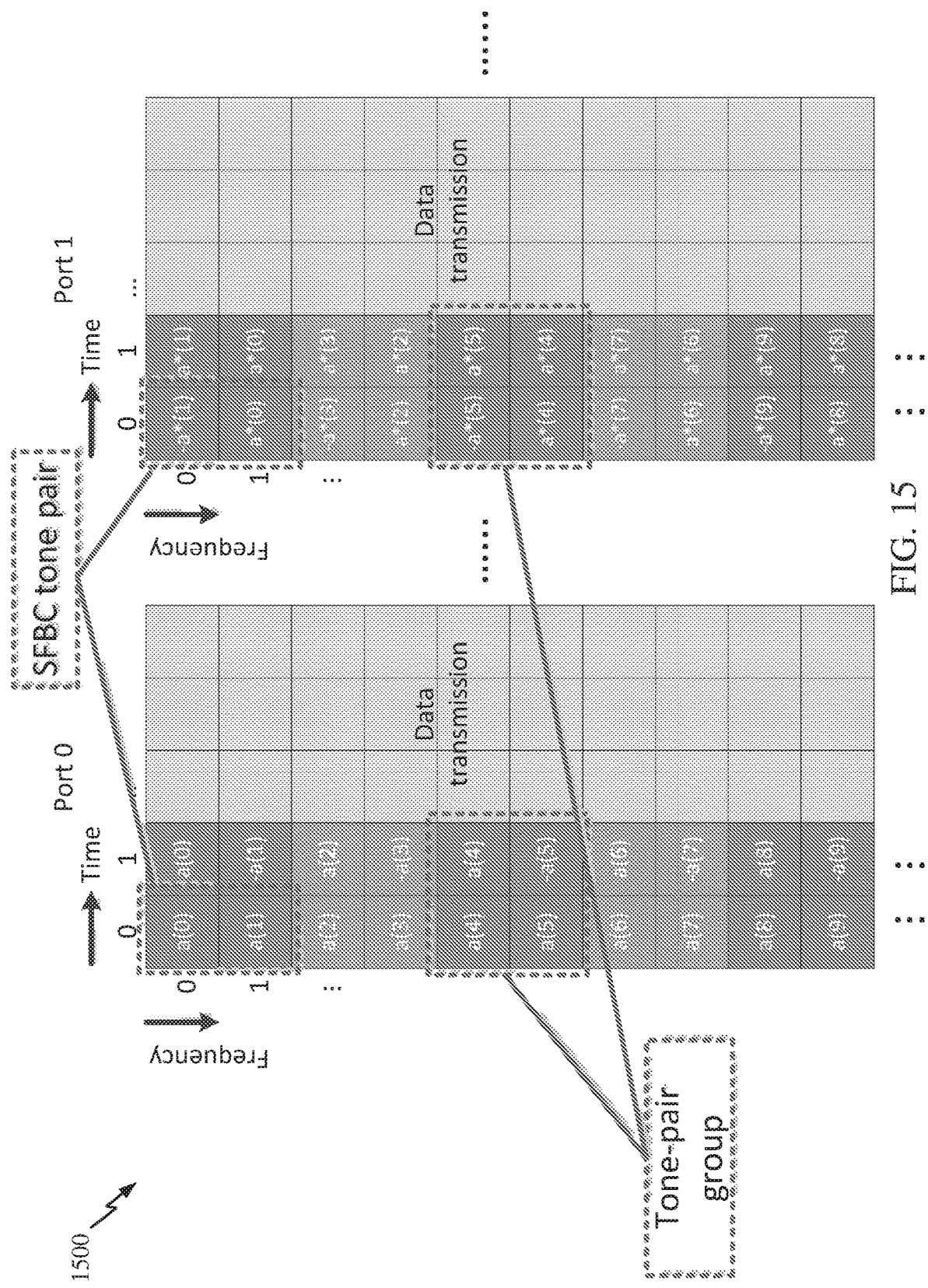
FIGS. 15-16 illustrates example resource grids corresponding to the example DM-RS designs illustrated in FIG. 14, in accordance with certain aspects of the present disclosure.
Figure 16:
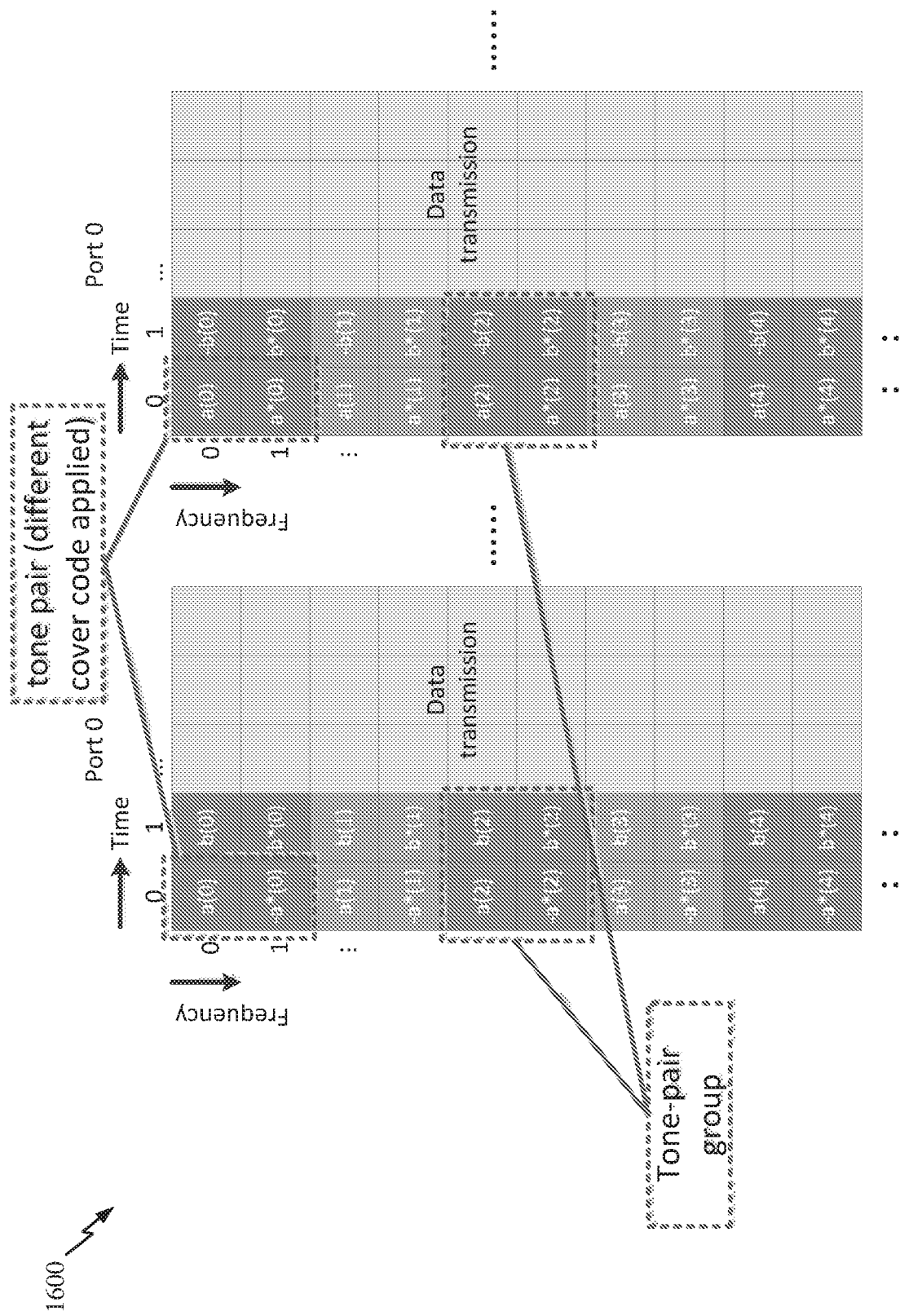

FIG. 14 illustrates example matrices representing DM-RS designs for SFBC and the average Rnn (Rzz). FIGS. 15-16 illustrates example resource grids corresponding to the example DM-RS designs illustrated in FIG. 14. For example, one implementation for the pilot sequence using Alamouti encoding is shown as option 1 in FIG. 14 and the corresponding resource grid 1500 is illustrated in FIG. 15. Another implementation for the pilot sequence using Modified Orthogonal Cover Code (OCC-2) is shown as option 2 in FIG. 14 and the corresponding resource grid 1600 is illustrated in FIG. 16.

According to certain aspects, at least some of the one or more pilots are generated using different cover codes. For example, different cover codes may be used for different tone pairs.

According to certain aspects, tones in a frequency tone pair and a different frequency tone pair may be consecutive or non-consecutive in the frequency and/or time domain.

As shown in FIGS. 14-16, the pilot sequence design may include transmitting the one or more pilots comprises transmitting the first pilot and the second pilot on the frequency tone pair using a first antenna port and transmitting the conjugate of the first pilot and the negative conjugate of the second pilot on the two frequency tones using a second antenna port. FIG. 15 shows a DM-RS pattern using Alamouti encoding. FIG. 16 shows a DM-RS pattern using Modified OCC-2. In both types of encoding there are two tones in each tone pair, and different tone pairs can span the frequency/time domain consecutively or separately. Other tones can be used for other DM-RS ports or be multiplexed with data.

For example, as shown in FIG. 15, the design may include transmitting the first pilot on a first tone of a first frequency tone pair using the first antenna port; transmitting the second pilot on a second tone of the first frequency tone pair using the first antenna port; transmitting the negative conjugate of the second pilot on the first tone of the first frequency tone pair using the second antenna port; transmitting the conjugate of the first pilot on the second tone of the first frequency tone pair using the second antenna port; transmitting a third pilot, equal to the first pilot, on the first tone of a second frequency tone pair using the first antenna port; transmitting a fourth pilot, equal to the negative of the second pilot, on a second tone of the second frequency tone pair using the first antenna port; transmitting the negative conjugate of the fourth pilot, equal to the conjugate of the second pilot, on the first tone of the second frequency tone pair using the second antenna port; and transmitting the conjugate of the third pilot, equal to the conjugate of the first pilot, on the second tone of the second frequency tone pair using the second antenna port.

Alternatively, as shown in FIG. 16, the design may include transmitting the first pilot on a first tone of a first frequency tone pair using the first antenna port; transmitting the negative conjugate of the first pilot on a second tone of the first frequency tone pair using the first antenna port; transmitting a second pilot, equal to the first pilot, on the first tone of the first frequency pair using the second antenna; transmitting the conjugate of the second pilot, equal to the conjugate of the first pilot, on the second tone of the first frequency pair using the second antenna port; transmitting a third pilot on the first tone of a second frequency tone pair using the first antenna port; transmitting the conjugate of the third pilot on a second tone of the second frequency tone pair using the first antenna port; transmitting a fourth pilot, equal to the negative of the third pilot, on the first tone of the second frequency tone pair using the second antenna port;

and transmitting the negative conjugate of the fourth pilot, equal to the conjugate of the third pilot, on the second tone of the second frequency tone pair using the second antenna port.

Example Pilot Sequence Design for Rank-2 Spatial Multiplexing

In some cases, SFBC may be interfered by rank-2 spatial multiplexing. This may also lead to mismatch between the Rnn seen on the data tones and Rnn measured on the DM-RS tones. In rank-2 spatial multiplexing, two different data symbols are transmitted using different DM-RS ports in each tone. Therefore, four data symbols may be transmitted per two tones. FIG. 17 illustrates example Rnn mismatch on data and DM-RS tones for rank-2 spatial multiplexing. In FIG. 17, the first four columns represent the transmission on the tones and the last two columns show the mismatch.

Figure 19:
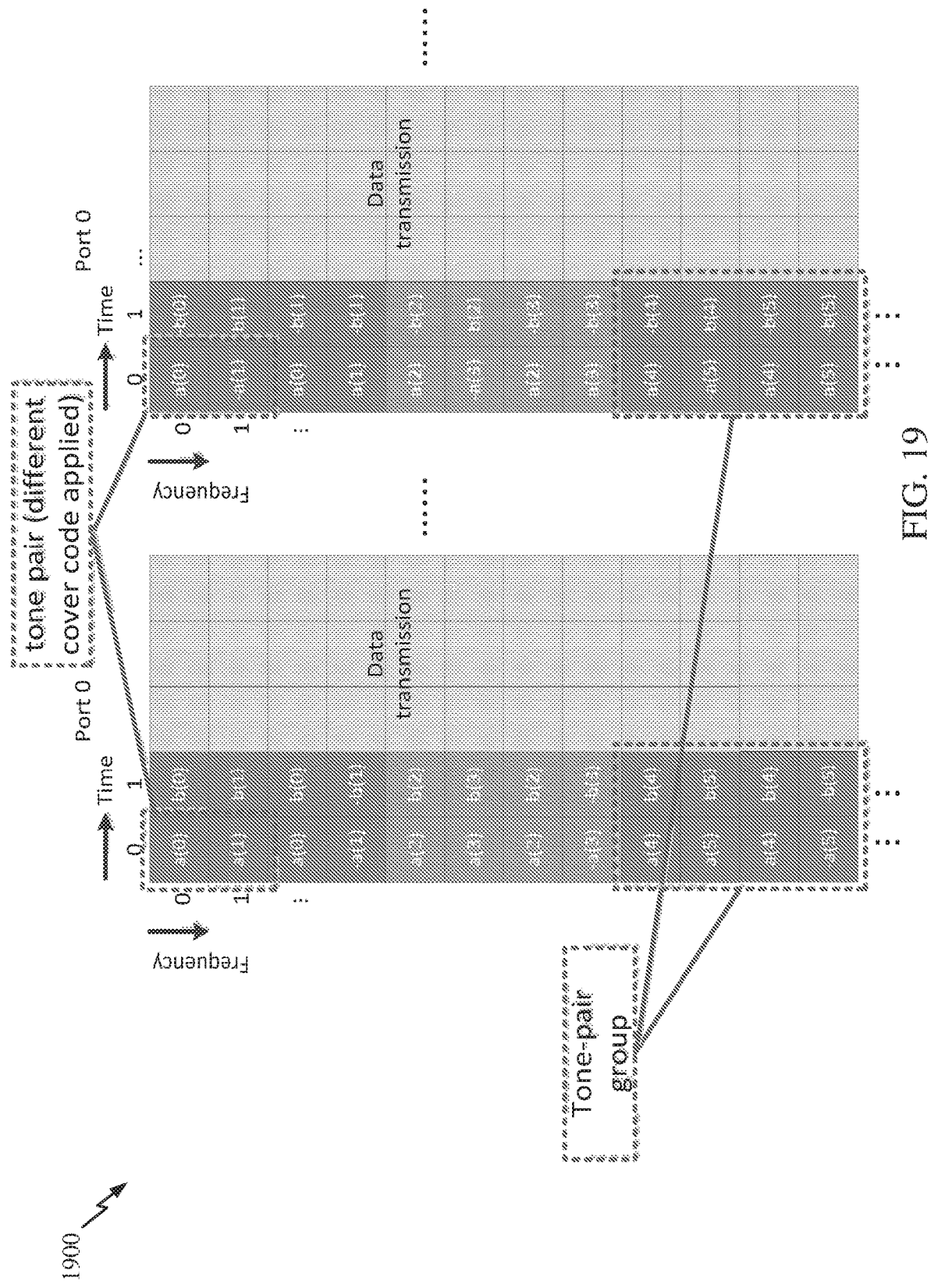
FIG. 19 illustrates example resource grids corresponding to the example DM-RS design illustrated in FIG. 18, in accordance with certain aspects of the present disclosure.

FIG. 18 illustrates example matrices representing DM-RS designs for rank-2 spatial multiplexing and corresponding Rzz, in accordance with certain aspects of the present disclosure. FIG. 19 illustrates example resource grids corresponding to the example DM-RS design illustrated in FIG. 18. The table at the bottom of FIG. 18 shows how the pilots can be transmitted in tone pairs. In FIG. 19, tones a and b are paired. Also shown in FIG. 19, four tone pairs are grouped.

As shown in FIGS. 18-19, for rank-2 spatial multiplexing, the pilot sequence design may include transmitting four pilot blocks on four frequency tone pairs, where transmission of the four pilots blocks satisfies $\alpha\alpha^H + \beta\beta^H + \gamma\gamma^H + \delta\delta^H = I_4$, where $\alpha = [\alpha_1, \alpha_2, \alpha_3, \alpha_4]^T$ is a first pilot block on a first frequency tone pair, $\alpha_1, \alpha_2$ are the pilots on a first frequency tone of the first frequency tone pair, $\alpha_3, \alpha_4$ are the pilots on a second frequency tone of the first frequency tone pair; $\alpha^H$ is the conjugate transpose of the first pilot block. $\beta = [\beta_1, \beta_2, \beta_3, \beta_4]^T$ is a second pilot block on a second frequency tone pair, and $\beta^H$ is the conjugate transpose of the second pilot block, $\gamma = [\gamma_1, \gamma_2, \gamma_3, \gamma_4]^T$ is a third pilot block on a third frequency tone pair, $\gamma^H$ is the conjugate transpose of the third pilot block, $\delta = [\delta_1, \delta_2, \delta_3, \delta_4]^T$ is a fourth pilot block on a fourth frequency tone pair, $\delta^H$ is the conjugate transpose of the fourth pilot block, and $I_4$ is a four-by-four identify matrix.

According to certain aspects, the four pilots can be generated using different cover codes. According to certain aspects, tones in a frequency tone pair and a different frequency tone pair may be consecutive or non-consecutive in the frequency and/or time domain.

The average covariance matrix of the pilots per tone-pair group (Rzz) may be given by:

$$R_{zz} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 13-15.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising: receiving a plurality of demodulation reference signal (DMRS) pilots based on at least one precoder used for transmitting data on a channel; estimating interference based on the plurality of DMRS pilots; decoding the data transmission based on the interference estimate; and wherein the plurality of DMRS pilots comprise at least one negative conjugate of a DMRS pilot.

2. The method of claim 1, wherein the plurality of DMRS pilots comprise demodulation reference signals (DM-RS) or channel state information reference signals (CSI-RS).

3. The method of claim 1, wherein receiving the data comprises receiving the data using space frequency block coding (SFBC).

4. The method of claim 1, wherein at least some of the plurality of DMRS pilots are generated using different cover codes.

5. The method of claim 1, wherein:
receiving the plurality of DMRS pilots comprises receiving a first pilot, a second pilot, a conjugate of the first pilot, and a negative conjugate of the second pilot on a frequency tone pair using two antenna ports.

6. The method of claim 5, further comprising:
receiving a third pilot, a fourth pilot, a conjugate of the third pilot, and a conjugate of a fourth pilot on a second frequency tone pair using the two antenna ports, wherein:
the plurality of DMRS pilots satisfies $\alpha_1\alpha_2^* + \beta_1\beta_2^* = 0$, where $\alpha_1$ is the first pilot, $\alpha_2^*$ is a conjugate of the second pilot, $\beta_1$ is the third pilot, and $\beta_2^*$ is the conjugate of the fourth pilot.

7. The method of claim 6, wherein: the first pilot and the second pilot received in the first frequency tone pair are generated using a first cover code; and the third pilot and the fourth pilot received in the second frequency tone pair are generated using a second cover code, different than the first cover code, such that the plurality of DMRS pilots satisfies $\alpha 1\alpha 2^* + \beta 1\beta 2^* = 0$.

8. The method of claim 5, wherein the frequency tone pair comprises at least one of: consecutive frequency tones, non-consecutive frequency tones, or the same frequency tone received at different time instances.

9. The method of claim 5, wherein:
receiving the plurality of DMRS pilots comprises receiving the first pilot and the second pilot on the frequency tone pair using a first antenna port; and
receiving the conjugate of the first pilot and the negative conjugate of the second pilot on the two frequency tones using a second antenna port.

10. The method of claim 9, wherein receiving the plurality of DMRS pilots comprises:
receiving the first pilot on a first tone of a first frequency tone pair using the first antenna port;
receiving the second pilot on a second tone of the first frequency tone pair using the first antenna port;
receiving the negative conjugate of the second pilot on the first tone of the first frequency tone pair using the second antenna port; and
receiving the conjugate of the first pilot on the second tone of the first frequency tone pair using the second antenna port.

11. The method of claim 10, further comprising:
receiving a third pilot, equal to the first pilot, on the first tone of a second frequency tone pair using the first antenna port;
receiving a fourth pilot, equal to the negative of the second pilot, on a second tone of the second frequency tone pair using the first antenna port;
receiving the negative conjugate of the fourth pilot, equal to the conjugate of the second pilot, on the first tone of the second frequency tone pair using the second antenna port; and receiving the conjugate of the third pilot, equal to the conjugate of the first pilot, on the second tone of the second frequency tone pair using the second antenna port.

12. The method of claim 5, wherein
receiving the plurality of DMRS pilots further comprises:
receiving the first pilot and a negative conjugate of the first pilot on the frequency tone pair using a first antenna port; and
receiving the second pilot and a conjugate of the second pilot on the frequency tone pair using a second antenna port.

13. The method of claim 12, wherein receiving the plurality of DMRS pilots comprises: receiving the first pilot on a first tone of a first frequency tone pair using the first antenna port; receiving the negative conjugate of the first pilot on a second tone of the first frequency tone pair using the first antenna port; receiving the second pilot, equal to the first pilot, on the first tone of the first frequency tone pair using the second antenna port; and receiving the conjugate of the second pilot, equal to the conjugate of the first pilot, on the second tone of the first frequency tone pair using the second antenna port.

14. The method of claim 13, further comprising:
receiving a third pilot on the first tone of a second frequency tone pair using the first antenna port;
receiving the conjugate of the third pilot on a second tone of the second frequency tone pair using the first antenna port;
receiving a fourth pilot, equal to the negative of the third pilot on the first tone of the second frequency tone pair using the second antenna port; and
receiving the negative conjugate of the fourth pilot, equal to the conjugate of the third pilot, on the second tone of the second frequency tone pair using the second antenna port.

15. The method of claim 1, wherein:
the data is receiving using rank-2 spatial multiplexing;
receiving the plurality of DMRS pilots comprises receiving four pilot blocks on four frequency tone pairs; and
the four pilots blocks satisfies $\alpha\alpha^H + \beta\beta^H + \gamma\gamma^H + \delta\delta^H = I_4$, where $\alpha = [\alpha_1, \alpha_2, \alpha_3, \alpha_4]^T$ is a first pilot block on a first frequency tone pair, $\alpha_1, \alpha_2$ are the pilots on a first frequency tone of the first frequency tone pair, $\alpha_3, \alpha_4$ are the pilots on a second frequency tone of the first frequency tone pair; $\alpha^H$ is the conjugate transpose of the first pilot block, $\beta = [\beta_1, \beta_2, \beta_3, \beta_4]^T$ is a second pilot block on a second frequency tone pair, and $\beta^H$ is the conjugate transpose of the second pilot block, $\gamma = [\gamma_1, \gamma_2, \gamma_3, \gamma_4]^T$ is a third pilot block on a third frequency tone pair, $\gamma^H$ is the conjugate transpose of the third pilot block, $\delta = [\delta_1, \delta_2, \delta_3, \delta_4]^T$ is a fourth pilot block on a fourth frequency tone pair, $\delta^H$ is the conjugate transpose of the fourth pilot block, and $I_4$ is a four-by-four identify matrix.

16. The method of claim 15, wherein:
the four pilot blocks received in the four frequency tone pairs are generated using different cover codes such that the four pilots blocks satisfies $\alpha\alpha^H + \beta\beta^H + \gamma\gamma^H + \delta\delta^H = I_4$.

17. A method for wireless communications by a user equipment (UE), comprising: transmitting a plurality of demodulation reference signal (DMRS) pilots based on at least one precoder used for transmitting data; transmitting the data based on the at least one precoder; and wherein the plurality of DMRS pilots comprise at least one negative conjugate of a DMRS pilot.

18. A method for wireless communications by a base station (BS), comprising: transmitting a plurality of demodulation reference signal (DMRS) pilots based on at least one precoder used for transmitting data; transmitting the data based on the at least one precoder; and wherein the plurality of DMRS pilots comprise at least one negative conjugate of a DMRS pilot.

19. The method of claim 18, wherein:
transmitting the plurality of DMRS pilots comprises transmitting a first pilot, a second pilot, a conjugate of the first pilot, and a negative conjugate of the second pilot on a frequency tone pair using two antenna ports.

20. The method of claim 19, further comprising:
transmitting a third pilot, a fourth pilot, a conjugate of the third pilot, and a conjugate of the fourth pilot on a second frequency tone pair using the two antenna ports, wherein:
the plurality of DMRS pilots satisfies $\alpha_1\alpha_2^* + \beta_1\beta_2^* = 0$, where $\alpha_1$ is the first pilot, $\alpha_2^*$ is the conjugate of the second pilot, $\beta_1$ is the third pilot, and $\beta_2^*$ is the conjugate of the fourth pilot.

21. The method of claim 20, wherein: the first pilot and the second pilot transmitted in the first frequency tone pair are generated using a first cover code; and the third pilot and the fourth pilot transmitted in the second frequency tone pair are generated using a second cover code, different than the first cover code, such that the plurality of DMRS pilots satisfies $\alpha 1 \alpha 2^* + \beta 1 \beta 2^* = 0$.

22. The method of claim 19, wherein the frequency tone pair comprises at least one of: consecutive frequency tones, non-consecutive frequency tones, or the same frequency tone transmitted at different time instances.

23. The method of claim 19, wherein:
transmitting the plurality of DMRS pilots comprises transmitting the first pilot and the second pilot on the frequency tone pair using a first antenna port; and
transmitting the conjugate of the first pilot and the negative conjugate second pilot on the two frequency tones using a second antenna port.

24. The method of claim 23, wherein transmitting the plurality of DMRS pilots comprises:
transmitting the first pilot on a first tone of a first frequency tone pair using the first antenna port;
transmitting the second pilot on a second tone of the first frequency tone pair using the first antenna port;
transmitting the negative conjugate of the second pilot on the first tone of the first frequency tone pair using the second antenna port; and
transmitting the conjugate of the first pilot on the second tone of the first frequency tone pair using the second antenna port.

25. The method of claim 24, further comprising:
transmitting a third pilot, equal to the first pilot, on the first tone of a second frequency tone pair using the first antenna port;
transmitting a fourth pilot, equal to the negative of the second pilot, on a second tone of the second frequency tone pair using the first antenna port;
transmitting the negative conjugate of the fourth pilot, equal to the conjugate of the second pilot, on the first tone of the second frequency tone pair using the second antenna port; and
transmitting the conjugate of the third pilot, equal to the conjugate of the first pilot, on the second tone of the second frequency tone pair using the second antenna port.

26. The method of claim 19, wherein
transmitting the plurality of DMRS pilots comprises:
transmitting the first pilot and a negative conjugate of the first pilot on the frequency tone pair using a first antenna port; and
transmitting the second pilot and a conjugate of the second pilot on the frequency tone pair using a second antenna port.

27. The method of claim 26, wherein transmitting the plurality of DMRS pilots comprises: transmitting the first pilot on a first tone of a first frequency tone pair using the first antenna port; transmitting the negative conjugate of the first pilot on a second tone of the first frequency tone pair using the first antenna port; transmitting the second pilot, equal to the first pilot, on the first tone of the first frequency tone pair using the second antenna; and transmitting the conjugate of the second pilot, equal to the conjugate of the first pilot, on the second tone of the first frequency tone pair using the second antenna port.

28. The method of claim 27, further comprising:
transmitting a third pilot on the first tone of a second frequency tone pair using the first antenna port;
transmitting the conjugate of the third pilot on a second tone of the second frequency tone pair using the first antenna port;
transmitting a fourth pilot, equal to the negative of the third pilot on the first tone of the second frequency tone pair using the second antenna port; and
transmitting the negative conjugate of the fourth pilot, equal to the conjugate of the third pilot, on the second tone of the second frequency tone pair using the second antenna port.

29. The method of claim 18, wherein:
the data is receiving using rank-2 spatial multiplexing;
transmitting the plurality of DMRS pilots comprises transmitting four pilot blocks on four frequency tone pairs; and
the four pilots blocks satisfies $\alpha\alpha^H + \beta\beta^H + \gamma\gamma^H + \delta\delta^H = I_4$, where $\alpha = [\alpha_1, \alpha_2, \alpha_3, \alpha_4]^T$ is a first pilot block on a first frequency tone pair, $\alpha_1, \alpha_2$ are the pilots on a first frequency tone of the first frequency tone pair, $\alpha_3, \alpha_4$ are the pilots on a second frequency tone of the first frequency tone pair; $\alpha^H$ is the conjugate transpose of the first pilot block, $\beta = [\beta_1, \beta_2, \beta_3, \beta_4]^T$ is a second pilot block on a second frequency tone pair, and $\beta^H$ is the conjugate transpose of the second pilot block, $\gamma = [\gamma_1, \gamma_2, \gamma_3, \gamma_4]^T$ is a third pilot block on a third frequency tone pair, $\gamma^H$ is the conjugate transpose of the third pilot block, $\delta = [\delta_1, \delta_2, \delta_3, \delta_4]^T$ is a fourth pilot block on a fourth frequency tone pair, $\delta^H$ is the conjugate transpose of the fourth pilot block, and $I_4$ is a four-by-four identify matrix.

30. A method for wireless communications by a base station (BS), comprising: receiving a plurality of demodulation reference signal (DMRS) pilots based on at least one precoder used for transmitting data on a channel; estimating interference based on the plurality of DMRS pilots; decoding the data transmission based on the interference estimate; and wherein the plurality of DMRS pilots comprise at least one negative conjugate of a DMRS pilot.

31. A user equipment (UE) for wireless communication, comprising: a memory; and one or more processors, coupled to the memory, configured to: receive a plurality of demodulation reference signal (DMRS) pilots based on at least one precoder used for transmitting data on a channel; estimate interference based on the plurality of DMRS pilots; decode the data transmission based on the interference estimate; and wherein the plurality of DMRS pilots comprise at least one negative conjugate of a DMRS pilot.

32. A base station (BS) for wireless communication, comprising: a memory; and one or more processors, coupled to the memory, configured to: transmit a plurality of demodulation reference signal (DMRS) pilots based on at least one precoder used for transmitting data; transmit the data based on the at least one precoder; and wherein the plurality of DMRS pilots comprise at least one negative conjugate of a DMRS pilot.

* * * * *